(12) United States Patent
Kataoka et al.

(10) Patent No.: US 11,755,907 B2
(45) Date of Patent: Sep. 12, 2023

(54) FEATURE IDENTIFICATION DEVICE, FEATURE IDENTIFICATION METHOD, AND COMPUTER READABLE MEDIUM

(71) Applicant: Mitsubishi Electric Corporation, Tokyo (JP)

(72) Inventors: Eri Kataoka, Tokyo (JP); Hiroshi Yokochi, Tokyo (JP); Mitsuhiro Matsumoto, Tokyo (JP); Mikihito Kanno, Tokyo (JP); Takamichi Koide, Tokyo (JP); Yosuke Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 237 days.

(21) Appl. No.: 17/388,283

(22) Filed: Jul. 29, 2021

(65) Prior Publication Data

US 2021/0357635 A1     Nov. 18, 2021

Related U.S. Application Data

(63) Continuation of application No. PCT/JP2019/046249, filed on Nov. 26, 2019.

(30) Foreign Application Priority Data

Mar. 25, 2019    (JP) .................................. 2019-056844

(51) Int. Cl.
*G06N 3/08* (2023.01)
*G06V 30/414* (2022.01)
(Continued)

(52) U.S. Cl.
CPC ............... *G06N 3/08* (2013.01); *G06F 18/22* (2023.01); *G06F 18/241* (2023.01); *G06N 3/045* (2023.01);
(Continued)

(58) Field of Classification Search
CPC .......... G06N 3/08; G06N 3/045; G06F 18/22; G06F 18/241; G06F 16/55; G06F 16/56;
(Continued)

(56) References Cited

U.S. PATENT DOCUMENTS 5,638,465 A * 6/1997 Sano ..................... G06T 7/0006
    382/281
6,907,141 B1    6/2005 Okamoto
(Continued)

FOREIGN PATENT DOCUMENTS

JP    2001-256244 A    9/2001
JP    2007-317034 A    12/2007
(Continued)

OTHER PUBLICATIONS

International Search Report for PCT/JP2019/046249 dated Dec. 24, 2019.
Selvaraju et al., "Grad-CAM: Visual Explanations from Deep Networks via Gradient-based Localization", Mar. 21, 2017, total 24 pages.

*Primary Examiner* — Charlotte M Baker
(74) *Attorney, Agent, or Firm* — Birch, Stewart, Kolasch & Birch, LLP

(57) ABSTRACT

A similarity calculation unit (213) treats each of a plurality of classifications as a target classification, and calculates a similarity between a reference feature value, which is a feature value extracted from image data of the target classification, and a recognition feature value, which is a feature value extracted from recognition target data, which is image data to be recognized. An influence calculation unit (214) calculates an influence on the similarity with regard to each partial image of the recognition target data by taking as input the similarity with regard to each of the classifications and
(Continued)

the recognition feature value. A feature identification unit (215) changes the recognition feature value in accordance with the influence.

8 Claims, 10 Drawing Sheets

(51) Int. Cl.
    *G06F 18/22*     (2023.01)
    *G06F 18/241*     (2023.01)
    *G06N 3/045*     (2023.01)
    *G06V 30/40*     (2022.01)
    *G06V 30/19*     (2022.01)
    *G06V 10/82*     (2022.01)

(52) U.S. Cl.
    CPC ........ *G06V 10/82* (2022.01); *G06V 30/19173* (2022.01); *G06V 30/40* (2022.01); *G06V 30/414* (2022.01)

(58) Field of Classification Search
    CPC ............. G06V 10/82; G06V 30/19173; G06V 30/40; G06V 30/414; G06T 7/00
    USPC ......................................................... 382/181
    See application file for complete search history.

(56) References Cited

U.S. PATENT DOCUMENTS

| | | | |
|---|---|---|---|
| 8,565,493 B2* | 10/2013 | Ryu | ..................... G06V 40/172 |
| | | | 382/118 |
| 2012/0243779 A1* | 9/2012 | Nakai | ................... G06F 18/217 |
| | | | 382/159 |
| 2017/0337449 A1 | 11/2017 | Hamada et al. | |

FOREIGN PATENT DOCUMENTS

| | | | |
|---|---|---|---|
| JP | 2011-113125 A | 6/2011 |
| JP | 2016-110232 A | 6/2016 |
| JP | 6190027 B1 | 8/2017 |
| JP | 2017-207947 A | 11/2017 |
| JP | 2018-41445 A | 3/2018 |
| JP | 2018-67180 A | 4/2018 |
| JP | 6320649 B1 | 5/2018 |
| JP | 6349477 B1 | 6/2018 |
| JP | 2018-112891 A | 7/2018 |
| JP | 2018-165926 A | 10/2018 |

* cited by examiner

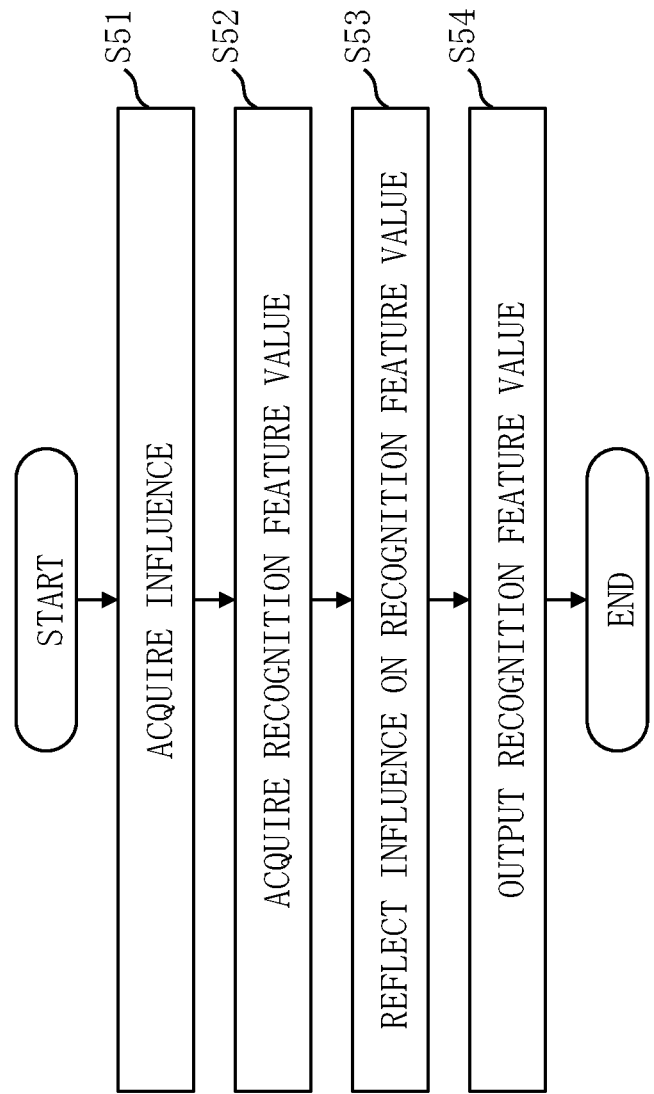

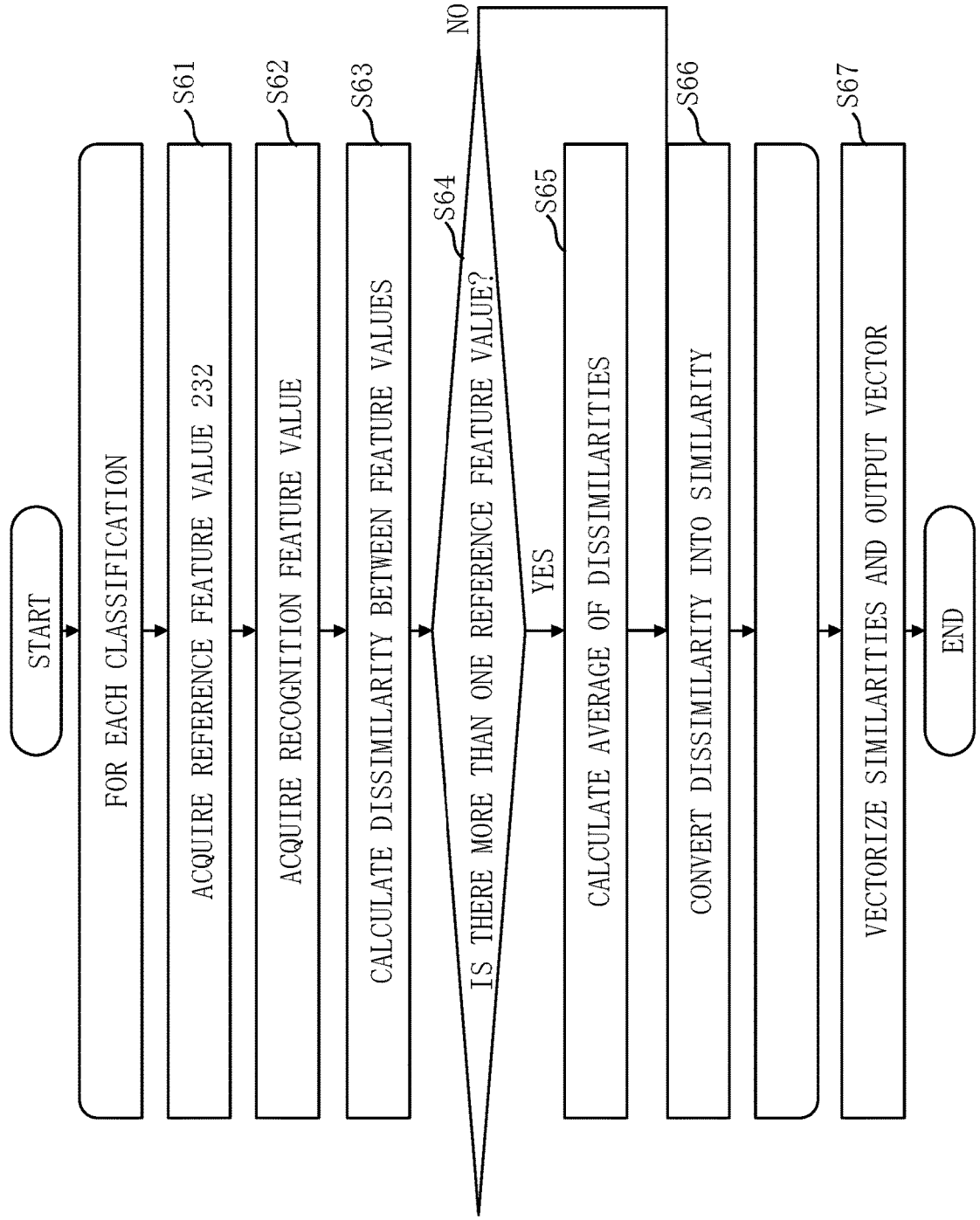

FEATURE IDENTIFICATION DEVICE, FEATURE IDENTIFICATION METHOD, AND COMPUTER READABLE MEDIUM

CROSS REFERENCE TO RELATED APPLICATIONS

This application is a Continuation of PCT International Application No. PCT/JP2019/046249, filed on Nov. 26, 2019, which claims priority under 35 U.S.C. 119(a) to Patent Application No. 2019-056844, filed in Japan on Mar. 25, 2019, all of which are hereby expressly incorporated by reference into the present application.

TECHNICAL FIELD

The present invention relates to a technique to identify features of image data.

BACKGROUND ART

In financial institutions, government offices, or the like, processes such as registration, change, and deletion of data using paper documents such as application forms are performed. The paper documents are processed, for example, in the flow of (1) sorting the documents, (2) checking for deficiencies, (3) (if there is no deficiency) registering contents, and (4) (if there is any deficiency) returning a document to a person who has filled it in. Since labor costs are required for performing these processes, it is desired to automate these processes.

As an effort to automate these processes, there is a system in which paper documents are digitized, entry items and entry contents are recognized by a computer, and deficiencies are determined (for example, see Patent Literature 1). In such a system, initial settings such as defining entry areas in paper documents are required before the system is placed in operation. It takes time and effort to perform these initial settings manually.

As a method for automatically extracting an entry area from image data of a paper document, the following method may be considered. A template is printed out or filled in using a paper document in advance. Then, the template is identified from image data of the paper document, and a portion other than the template is identified as an entry area. In order to realize this method, a technique to identify a template included in image data is required.

In a plurality of paper documents filled in by a plurality of persons, some entry areas may be filled in and some entry areas may not be filled in. In addition, the contents entered in the entry areas and the shapes of characters vary. Therefore, there is a high probability that feature portions in image data of the plurality of paper documents are a template. If there are paper documents of a plurality of classifications, there is a high probability that portions that contribute to the identification of each classification, that is, feature portions unique to that classification in the image data of the paper documents of each classification are a template.

Patent Literature 2 describes a technique to extract features of image data using a convolutional neural network (CNN). Non-Patent Literature 1 describes a technique to identify a portion in image data that serves as the basis for classification by a CNN.

CITATION LIST

Patent Literature

Patent Literature 1: JP 2018-067180 A
Patent Literature 2: JP 2016-110232 A

Non-Patent Literature

Non-Patent Literature 1: R. Selvaraju et al, "Grad-CAM: Visual Explanations from Deep Networks via Gradient-based Localization"

SUMMARY OF INVENTION

Technical Problem

When a feature portion unique to each classification is to be identified using the techniques described in Patent Literature 2 and Non-Patent Literature 1, it is necessary to construct a CNN that has learned parameters of each classification. Therefore, each time a classification is added, parameters of the CNN need to be re-learned, requiring computer resources and time.

It is an object of the present invention to allow a feature portion unique to each classification to be appropriately identified without re-learning parameters of a CNN even when a classification is added.

Solution to Problem

A feature identification device according to the present invention includes
a similarity calculation unit to treat each of a plurality of classifications as a target classification, and calculate a similarity between a reference feature value and a recognition feature value, the reference feature value being a feature value extracted from image data of the target classification, the recognition feature value being a feature value extracted from recognition target data, which is image data to be recognized;
an influence calculation unit to calculate an influence on the similarity with regard to each partial image of the recognition target data by taking as input the similarity with regard to each of the plurality of classifications calculated by the similarity calculation unit and the recognition feature value; and
a feature identification unit to change the recognition feature value in accordance with the influence calculated by the influence calculation unit.

Advantageous Effects of Invention

In the present invention, a similarity between a reference feature value and a recognition feature value is calculated with regard to each classification, and an influence on the similarity is calculated with regard to each partial image of recognition target data. Then, the recognition feature value is changed in accordance with the influence.

This allows a feature portion to be appropriately identified even when the reference feature value and the recognition feature value are extracted using a CNN that does not have information on classifications. Therefore, even when a classification is added, a feature portion can be appropriately identified without re-learning parameters of the CNN for extracting reference feature values and recognition feature values.

BRIEF DESCRIPTION OF DRAWINGS

FIG. 9 is a flowchart of a feature identification process according to the first embodiment; and FIG. 10 is a flowchart of a similarity calculation process according to a second variation.

DESCRIPTION OF EMBODIMENTS

First Embodiment

*Description of Configurations*

Figure 1:
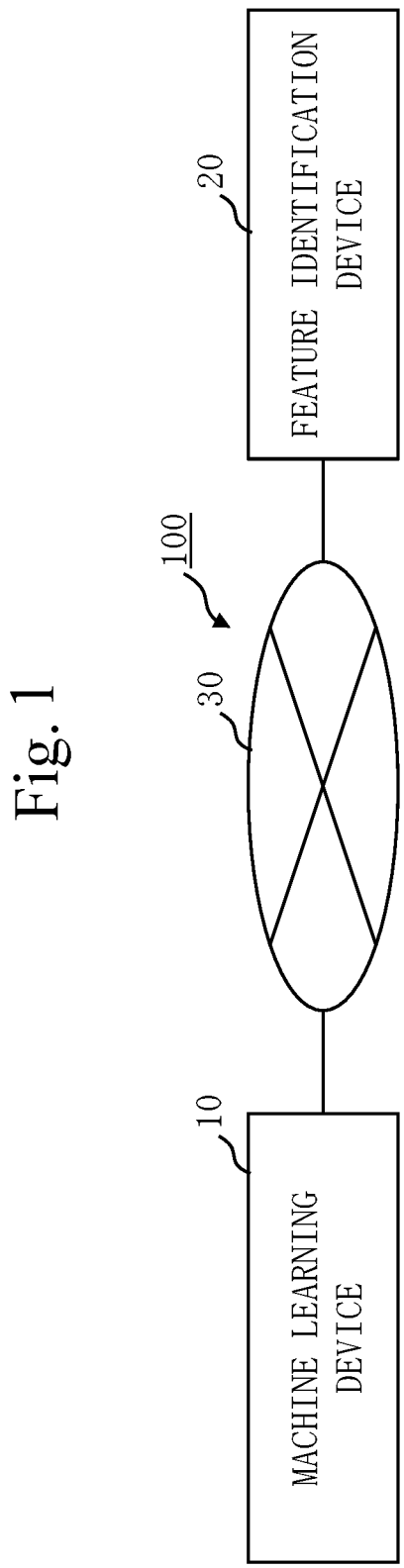
FIG. 1 is a configuration diagram of a feature identification system 100 according to a first embodiment.

Referring to FIG. 1, a configuration of a feature identification system 100 according to a first embodiment will be described.

The feature identification system 100 includes a machine learning device 10 and a feature identification device 20. The machine learning device 10 and the feature identification device 20 are connected via a communication channel 30 such as a local area network (LAN), and can exchange data with each other.

The machine learning device 10 and the feature identification device 20 may be realized by one device. In this case, the machine learning device 10 and the feature identification device 20 can exchange data via a signal line or the like of the device.

Figure 2:
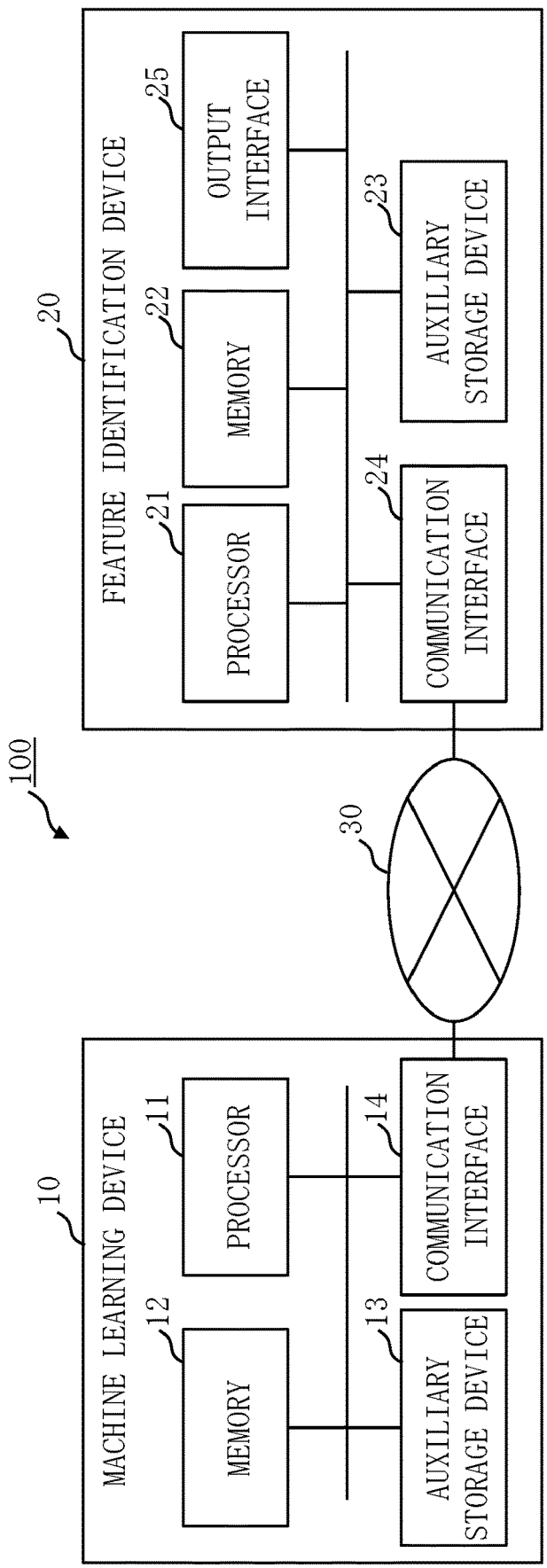
FIG. 2 is a hardware configuration diagram of a machine learning device 10 and a feature identification device 20 according to the first embodiment.

Referring to FIG. 2, hardware configurations of the machine learning device 10 and the feature identification device 20 according to the first embodiment will be described.

Each of the machine learning device 10 and the feature identification device 20 is a computer.

The machine learning device 10 includes a processor 11, a memory 12, an auxiliary storage device 13, and a communication interface 14. The feature identification device 20 includes a processor 21, a memory 22, an auxiliary storage device 23, a communication interface 24, and an output interface 25.

Each of the processors 11 and 21 is an integrated circuit (IC) that performs processing. Specific examples of each of the processors 11 and 21 are a central processing unit (CPU), a digital signal processor (DSP), and a graphics processing unit (GPU).

Each of the memories 12 and 22 is a storage device to temporarily store data. Specific examples of each of the memories 12 and 22 are a static random access memory (SRAM) and a dynamic random access memory (DRAM).

Each of the auxiliary storage devices 13 and 23 is a storage device to store data. A specific example of each of the auxiliary storage devices 13 and 23 is a hard disk drive (HDD). Each of the auxiliary storage devices 13 and 23 may be a portable recording medium, such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

Each of the communication interfaces 14 and 24 is an interface for communicating with external devices. Specific examples of each of the communication interfaces 14 and 24 are an Ethernet (registered trademark) port and a Universal Serial Bus (USB) port.

The output interface 25 is an interface for communicating with equipment such as a display device. A specific example of the output interface 25 is a High-Definition Multimedia Interface (HDMI, registered trademark) port.

Figure 3:
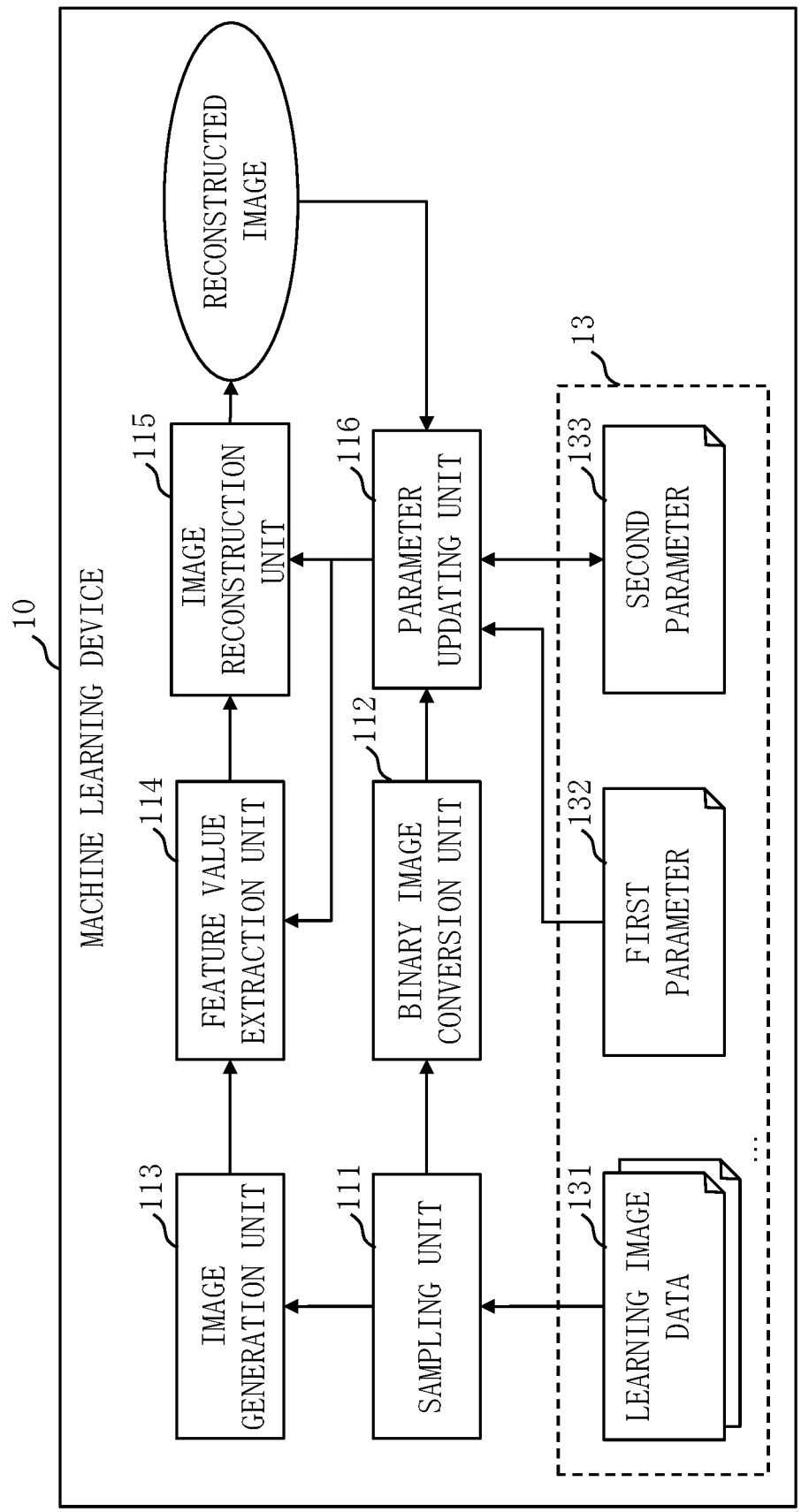
FIG. 3 is a functional configuration diagram of the machine learning device 10 according to the first embodiment.

Referring to FIG. 3, a functional configuration of the machine learning device 10 according to the first embodiment will be described.

The machine learning device 10 includes, as functional components, a sampling unit 111, a binary image conversion unit 112, an image generation unit 113, a feature value extraction unit 114, an image reconstruction unit 115, and a parameter updating unit 116. The functions of the functional components of the machine learning device 10 are realized by software.

The auxiliary storage device 13 stores programs for realizing the functions of the functional components of the machine learning device 10. These programs are read by the processor 11 into the memory 12 and executed by the processor 11. This realizes the functions of the functional components of the machine learning device 10.

The auxiliary storage device 13 also stores pieces of learning image data 131, a first parameter 132, and a second parameter 133.

Figure 4:
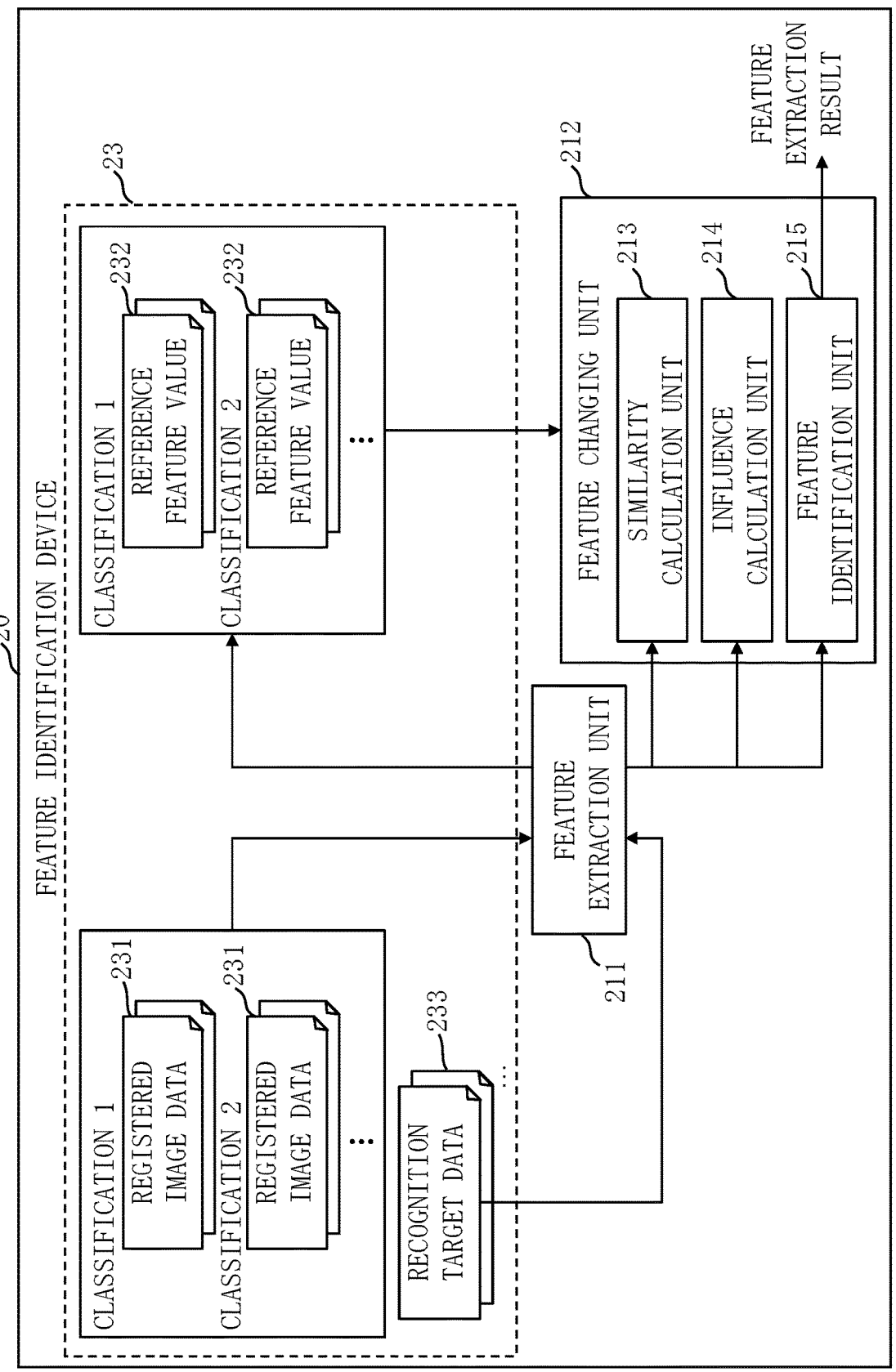
FIG. 4 is a functional configuration diagram of the feature identification device 20 according to the first embodiment.

Referring to FIG. 4, a functional configuration of the feature identification device 20 according to the first embodiment will be described.

The feature identification device 20 includes, as functional components, a feature extraction unit 211 and a feature changing unit 212. The feature changing unit 212 includes a similarity calculation unit 213, an influence calculation unit 214, and a feature identification unit 215. The functions of the functional components of the feature identification device 20 are realized by software.

The auxiliary storage device 23 stores programs for realizing the functions of the functional components of the feature identification device 20. These programs are read by the processor 21 into the memory 22 and executed by the processor 21. This realizes the functions of the functional components of the feature identification device 20.

The auxiliary storage device 23 also stores one or more pieces of registered image data 231 for each of a plurality of classifications, one or more reference feature values 232 for each of the plurality of classifications, and one or more pieces of recognition target data 233.

FIG. 2 illustrates only one processor 11. However, a plurality of processors 11 may be included, and the plurality of processors 11 may execute the programs for realizing the functions of the machine learning device 10 in cooperation. Similarly, a plurality of processors 21 may be included, and the plurality of processors 21 may execute the programs for realizing the functions of the feature identification device 20 in cooperation.

In the following description, exchange of data between the functional components within each of the devices may be performed by inter-process communication, or may be performed via the memory 12 or 22.

\*\*\*Description of Operation\*\*\*

Referring to FIGS. 5 to 9, operation of the feature identification system 100 according to the first embodiment will be described.

The operation of the feature identification system 100 according to the first embodiment corresponds to a feature identification method according to the first embodiment. The operation of the feature identification system 100 according to the first embodiment also corresponds to processes of a feature identification program according to the first embodiment.

Figure 5:
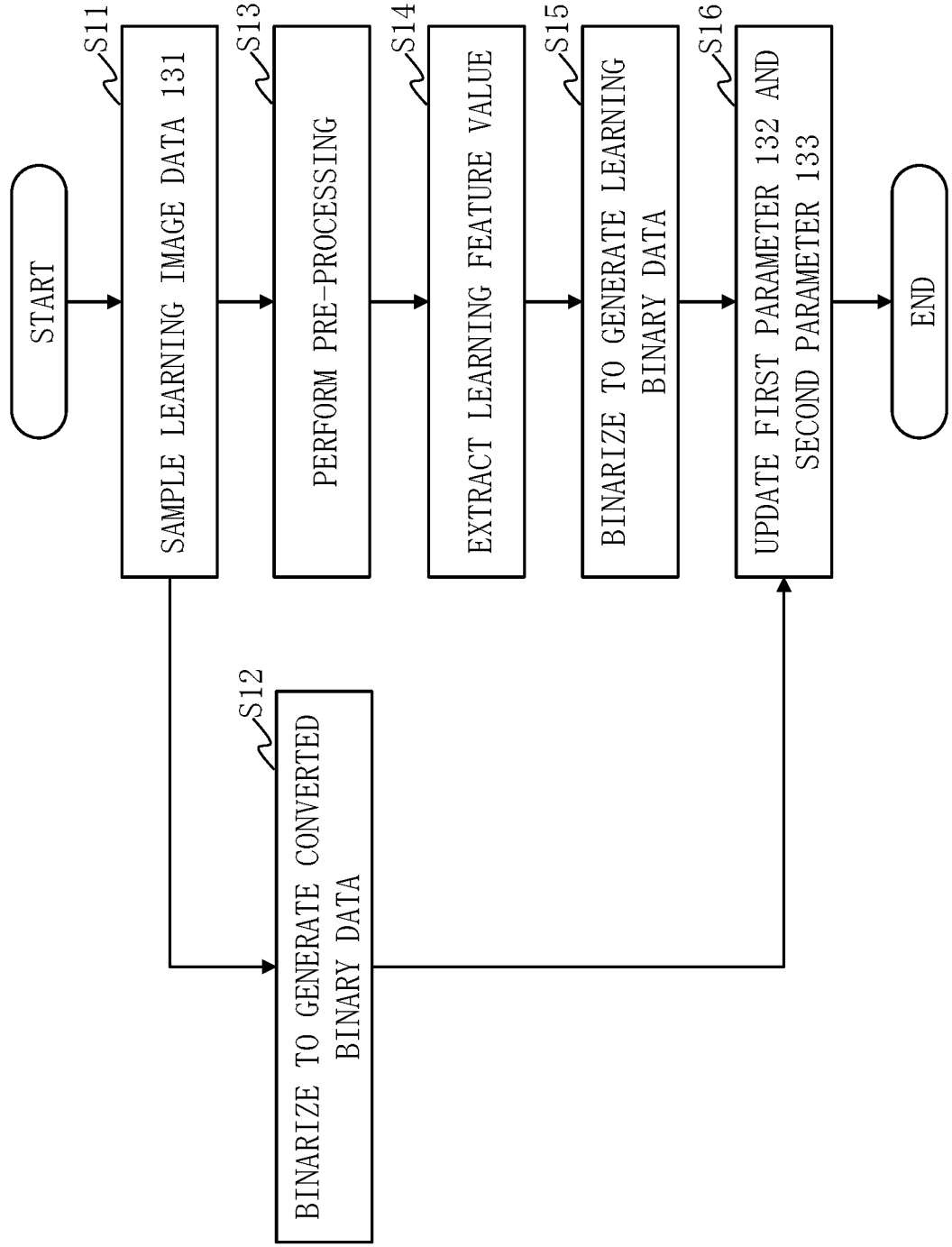
FIG. 5 is a flowchart illustrating operation of the machine learning device 10 according to the first embodiment.

Referring to FIG. 5, operation of the machine learning device 10 according to the first embodiment will be described.

The machine learning device 10 performs processes indicated in FIG. 5 by treating each of the pieces of learning image data 131 stored in the auxiliary storage device 13 as target data. By this, the first parameter 132 of a first neural network and the second parameter 133 of a second neural network are updated.

Each of the pieces of learning image data 131 is image data of one classification of the plurality of classifications to be covered in learning. In the first embodiment, each of the pieces of learning image data 131 is image data that is an image of a paper document of one classification of the plurality of classifications. Note that information on the classification is not included in each of the pieces of learning image data 131.

(Step S11: Sampling Process)

The sampling unit 111 samples pixel data from the target learning image data 131, and converts the pixel data into image data of a reference size. It is assumed here that each of the pieces of learning image data 131 is grayscale.

(Step S12: Binary Image Conversion Process)

The binary image conversion unit 112 binarizes the grayscale learning image data 131 that has been converted into the data of the reference size in step S11 so as to generate converted binary data, which is binary image data.

(Step S13: Image Generation Process)

The image generation unit 113 performs pre-processing necessary for learning on the grayscale learning image data 131 that has been converted into the data of the reference size in step S11.

As a specific example, the image generation unit 113 removes noise at the time of acquisition of the image from the learning image data 131 so as to cause the learning image data 131 to be in a smooth state. Alternatively, the image generation unit 113 adds noise to the learning image data 131 so as to cause the learning image data 131 to have variations. The following methods may be considered as methods for adding noise: adding Gaussian noise, salt-and-pepper noise, a Gaussian blur, or the like, performing operations such as rotation, shifting, and scaling, or adjusting setting values such as a brightness value, contrast, and sharpness.

(Step S14: Feature Value Extraction Process)

Using the first neural network, the feature value extraction unit 114 extracts, as a learning feature value, a feature value of each pixel from the learning image data 131 on which the pre-processing has been performed in step S13. At this time, the first neural network extracts the learning feature value by referring to the first parameter 132 stored in the auxiliary storage device 13. In the first embodiment, the first neural network is assumed to be a CNN.

(Step S15: Image Reconstruction Process)

The image reconstruction unit 115 takes as input the learning feature value extracted in step S14, and using the second neural network, binarizes the learning image data 131 so as to generate learning binary data, which is binary image data. At this time, the second neural network generates the learning binary data by referring to the second parameter 133 stored in the auxiliary storage device 13. In the first embodiment, the second neural network is assumed to be a CNN.

(Step S16: Parameter Updating Process)

The parameter updating unit 116 calculates a difference between the converted binary data generated in step S12 and the learning binary data generated in step S15. The parameter updating unit 116 updates the first parameter 132, which is the parameter of the first neural network, and the second parameter 133, which is the parameter of the second neural network, based on the calculated difference.

Figure 6:
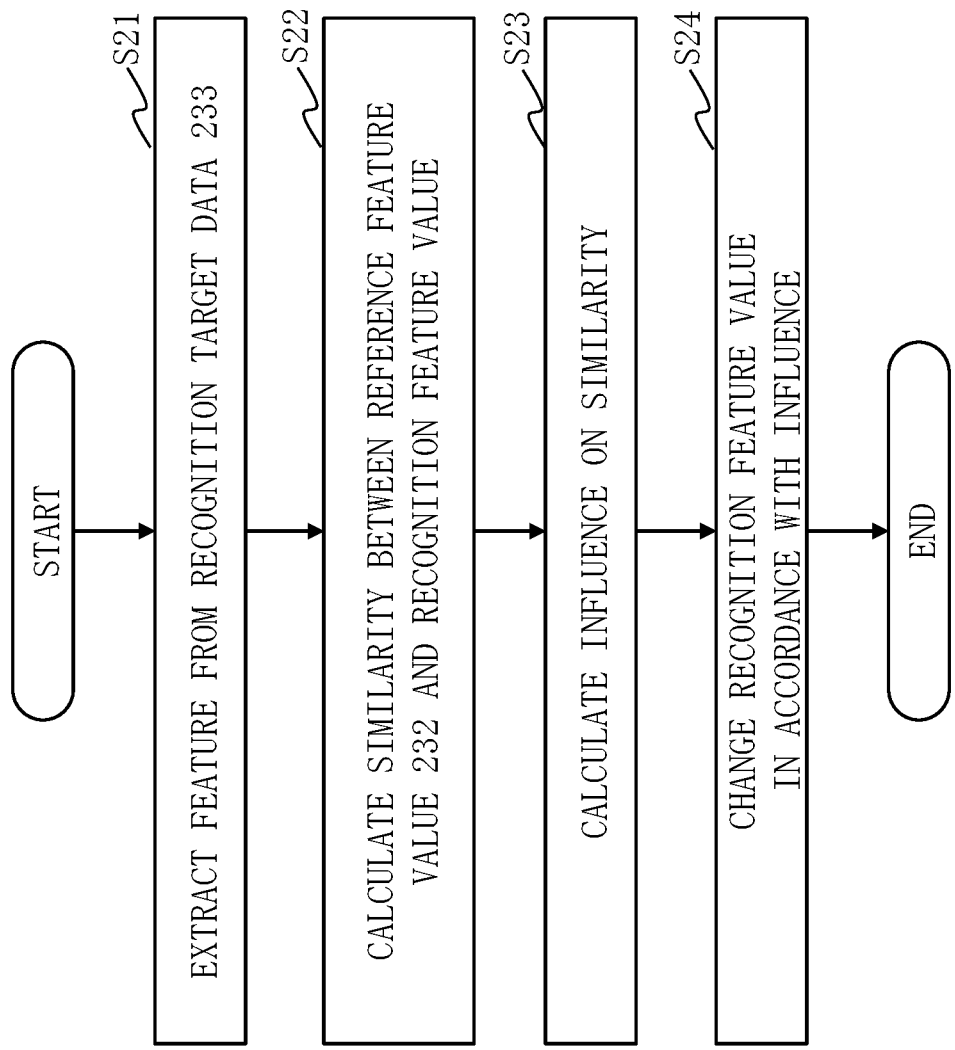
FIG. 6 is a flowchart illustrating operation of the feature identification device 20 according to the first embodiment.

Referring to FIG. 6, operation of the feature identification device 20 according to the first embodiment will be described.

As a precondition for processes indicated in FIG. 6, the feature extraction unit 211 treats each of the pieces of registered image data 231 stored in the auxiliary storage device 23 as target data, extracts a feature value of each pixel from the target registered image data 231 as a reference feature value 232, and stores it in the auxiliary storage device 23.

One or more pieces of registered image data 231 are stored in the auxiliary storage device 23 for each of the plurality of classifications to be covered in the processes. Each of the pieces of registered image data 231 is associated with information indicating a classification. The pieces of registered image data 231 may include the same image data as the learning image data 131, or may include only different image data.

Specifically, the feature extraction unit 211 extracts the reference feature value 232 from the target registered image data 231, using as a feature extraction model the first neural network generated by the machine learning device 10. At this time, the first neural network extracts the reference feature value 232 by referring to the first parameter 132. Then, the feature extraction unit 211 stores the reference feature value 232 extracted from each of the pieces of the registered image data 231 in the auxiliary storage device 23 in association with information indicating a classification.

As a result, one or more reference feature values 232 are stored in the auxiliary storage device 23 for each of the classifications.

(Step S21: Feature Extraction Process)

The feature extraction unit 211 extracts, as a recognition feature value, a feature value of each pixel from recognition target data 233, which is image data to be recognized.

The recognition target data 233 is image data of one classification of the plurality of classifications to be covered in the processes. The recognition target data 233 may be the same image data as the learning image data 131 or may be different image data.

Specifically, the feature extraction unit 211 extracts the recognition feature value from the recognition target data 233, using as a feature extraction model the first neural network generated by the machine learning device 10. At this time, the first neural network extracts the recognition feature value by referring to the first parameter 132.

(Step S22: Similarity Calculation Process)

The similarity calculation unit 213 treats each of the plurality of classifications as a target classification, and calculates a similarity between the reference feature value 232, which is a feature value extracted from the image data of the target classification, and the recognition feature value extracted in step S21.

(Step S23: Influence Calculation Process)

The influence calculation unit 214 takes as input the similarity with regard to each of the classifications calculated in step S22 and the recognition feature value extracted in step S21, and calculates an influence on the similarity with regard to each partial image of the recognition target data.

(Step S24: Feature Identification Process)

The feature identification unit 215 changes the recognition feature value extracted in step S21 in accordance with the influence calculated in step S23, and identifies a feature portion in the recognition target data 233. Then, the feature identification unit 215 identifies the identified portion as a template in the paper document and other portion as entry areas.

Figure 7:
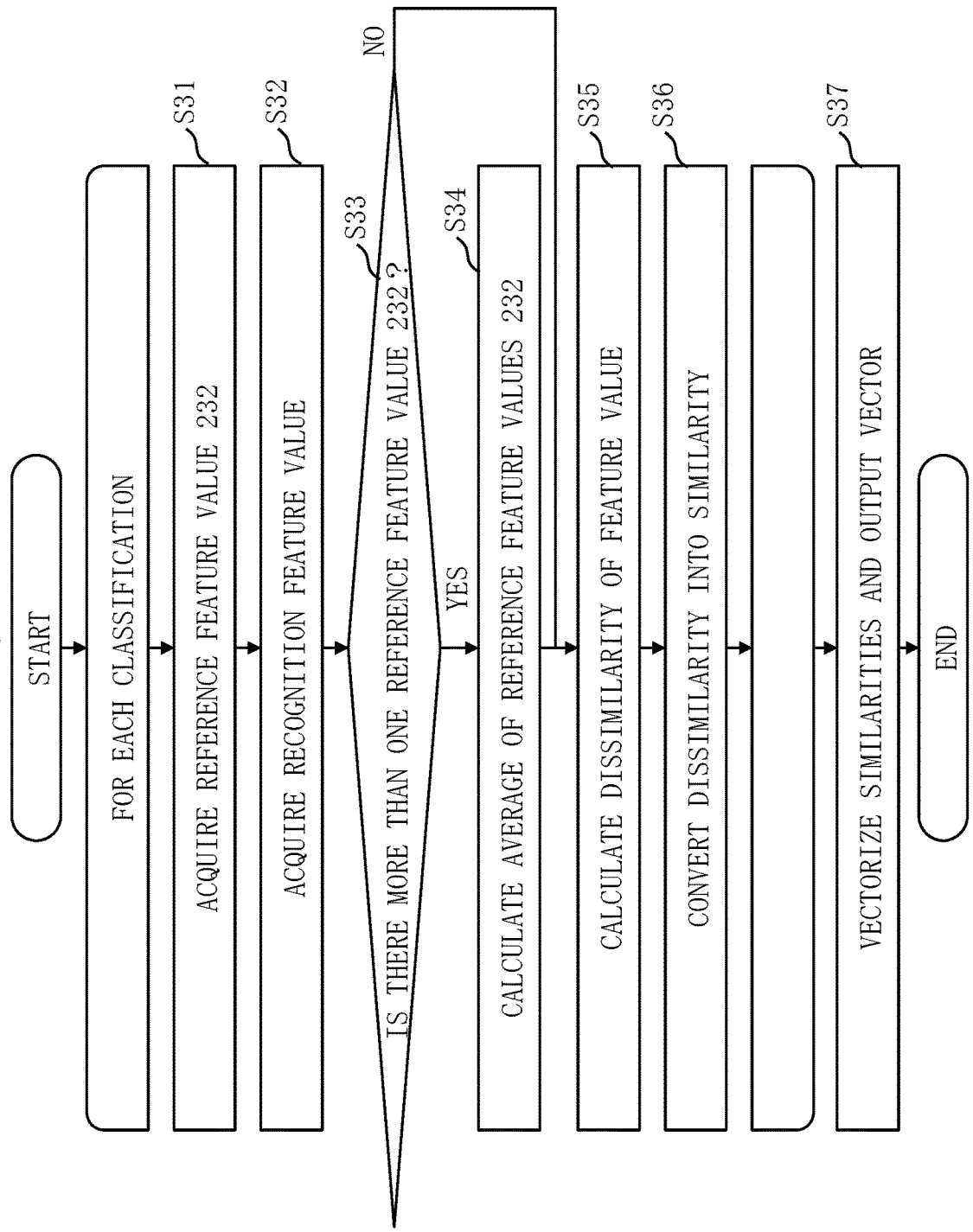
FIG. 7 is a flowchart of a similarity calculation process according to the first embodiment.

Referring to FIG. 7, a similarity calculation process (step S22 of FIG. 6) according to the first embodiment will be described.

The processes from step S31 to step S36 are performed by treating each of the classifications as a target classification.

In step S31, the similarity calculation unit 213 acquires one or more reference feature values 232 of the target classification from the auxiliary storage device 23. In step S32, the similarity calculation unit 213 acquires the recognition feature value extracted in step S21 of FIG. 6.

In step S33, the similarity calculation unit 213 advances the process to step S34 if more than one reference feature value 232 has been retrieved in step S31, and advances the process to step S35 if one reference feature value 232 has been retrieved in step S31. In step S34, the similarity calculation unit 213 treats the average of the reference feature values 232 as the reference feature value 232 of the target classification. The similarity calculation unit 213 may set one reference feature value 232 of the target classification by any method, which is not limited to averaging.

In step S35, the similarity calculation unit 213 calculates a dissimilarity between the reference feature value 232 and the recognition feature value acquired in step S32.

As a specific example, the similarity calculation unit 213 calculates the dissimilarity by calculating the distance between the reference feature value 232 and the recognition feature value. Specifically, the similarity calculation unit 213 calculates the dissimilarity between the reference feature value 232 and the recognition target data 233, using a mean squared error of each pixel. In this case, the similarity calculation unit 213 calculates a squared error, which is the distance between the reference feature value 232 and the recognition target feature value, for each pixel, and calculates the average of squared errors of all pixels as the dissimilarity. That is, the similarity calculation unit 213 calculates the dissimilarity as indicated in Formula 1.

$$\text{dissimilarity}_j = \Sigma_k(\text{feature}_k - \text{basis}_{jk})^2 \quad \text{(Formula 1)}$$

Note that $\text{basis}_{jk}$ is the reference feature value 232 of a pixel k of the registered image data 231 of a classification j, $\text{feature}_k$ is the recognition feature value of the pixel k of the recognition target data 233, and $\text{dissimilarity}_j$ is the dissimilarity with regard to the classification j.

As another specific example, the similarity calculation unit 213 calculates the dissimilarity between the reference feature value 232 and the recognition target data 233 by weighting the average squared error.

In this case, the weight is determined for each classification such that the higher the influence of a pixel is, the larger its value becomes. Alternatively, the weight is determined for each classification such that the greater the variation (standard deviation), among the registered image data 231, of feature values of a pixel is, the smaller its value becomes. Alternatively, the weight may be determined by a combination of these two.

That is, the similarity calculation unit 213 calculates the dissimilarity as indicated in Formula 2.

$$\text{dissimilarity}_j = \Sigma_k w_{jk}(\text{feature}_k - \text{basis}_{jk})^2 \quad \text{(Formula 2)}$$

Note that $w_{jk}$ is the weight for the pixel k of the registered image data 231 of the classification j. The weight $w_{jk}$ is, for example, $|\text{basis}_{jk}|^2/\sigma_{jk}$, where $\sigma_{jk}$ is the standard deviation with regard to the pixel k of the registered image data 231 of the classification j.

In step S36, the similarity calculation unit 213 converts the dissimilarity calculated in step S35 into a similarity. At this time, the similarity calculation unit 213 calculates the similarity such that the higher the dissimilarity is, the lower the similarity becomes, and the lower the dissimilarity is, the higher the similarity becomes. As a specific example, the similarity calculation unit 213 calculates the similarity by normalizing the dissimilarity in the range of 0 to 1 and subtracting the normalized dissimilarity from 1.

In step S37, the similarity calculation unit 213 outputs a vector whose elements are the similarities respectively calculated for the classifications, as a similarity vector.

Figure 8:
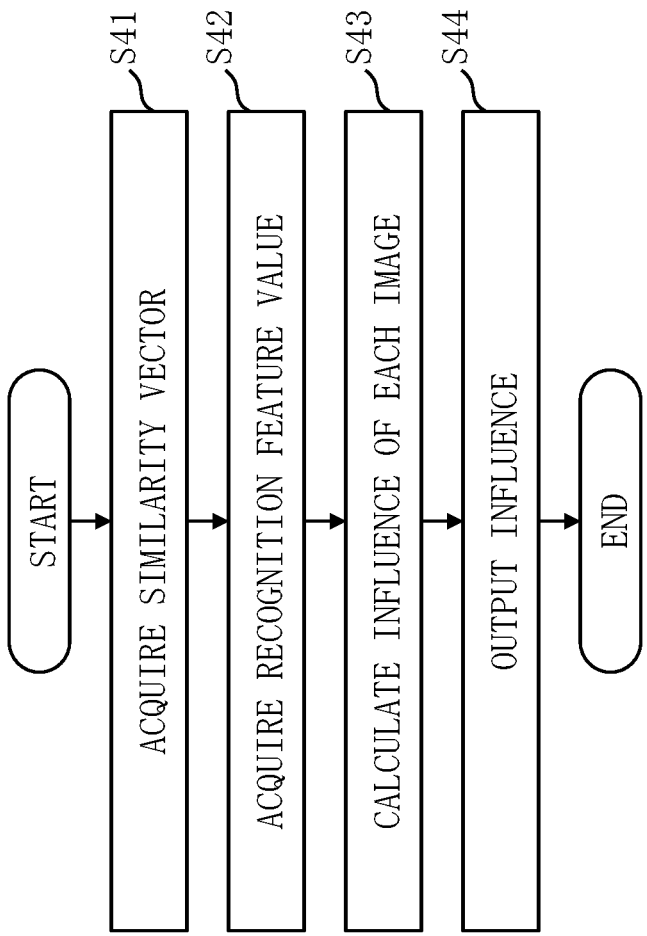
FIG. 8 is a flowchart of an influence calculation process according to the first embodiment.

Referring to FIG. 8, an influence calculation process (step S23 of FIG. 6) according to the first embodiment will be described.

In step S41, the influence calculation unit 214 acquires the similarity vector output in step S37 of FIG. 7. In step S42, the influence calculation unit 214 acquires the recognition feature value extracted in step S21 of FIG. 6.

In step S43, the influence calculation unit 214 takes as input the similarity vector acquired in step S41 and the recognition feature value acquired in step S42, and calculates, as an influence, a magnitude of impact on the similarity when each pixel, which is each partial image, of the recognition target data 233 is changed. Specifically, the influence calculation unit 214 calculates the influence of each pixel by inputting the similarity vector and the recognition feature value to Grad-CAM. That is, the influence is a gradient. Grad-CAM is described in Non-Patent Literature 1.

In step S44, the influence calculation unit 214 outputs the influence calculated in step S43. Note that a feature value has a plurality of layers. Therefore, the influence calculation unit 214 may output the influence of each of the layers of the feature value, or may output the average of the influences of the layers of the feature value.

Referring to FIG. 9, a feature identification process (step S24 of FIG. 6) according to the first embodiment will be described.

In step S51, the feature identification unit 215 acquires the influence output in step S44 of FIG. 8. In step S52, the feature identification unit 215 acquires the recognition feature value extracted in step S21 of FIG. 6.

In step S53, the feature identification unit 215 uses the influence acquired in step S51 as the weight and weights the recognition feature value acquired in step S52 so as to change the recognition feature value. At this time, if the influence is output for each layer, the feature identification unit 215 performs weighting on a per layer basis. In step S54, the feature identification unit 215 outputs the recognition feature value changed in step S53 to a display device or the like via the output interface 25. With this recognition feature value, the feature portion of the recognition target data 233 has been identified.

\*\*\*Effects of First Embodiment\*\*\*

As described above, the feature identification device 20 according to the first embodiment calculates a similarity between the reference feature value 232 and a recognition feature value with regard to each classification, and calculates an influence on the similarity with regard to each partial image (each pixel) of the recognition target data 233. Then, the recognition feature value is changed in accordance with the influence.

This allows a feature portion to be appropriately identified even when the reference feature value 232 and the recognition feature value are extracted using a CNN that does not have information on classifications. Therefore, even when a classification is added, a feature portion unique to the classification can be appropriately identified without re-learning parameters of the CNN for extracting reference feature values and recognition feature values. As a result, even when a classification is added, a template and an entry portion can be appropriately identified without re-learning parameters of the CNN.

\*\*\*Other Configurations\*\*\*

<First Variation>

The machine learning device 10 is required to satisfy the condition that learning of the first neural network is performed without including information on a classification in learning image data 131 that is given as input to the feature value extraction unit 114. As long as this condition is satisfied, the configuration of the machine learning device 10 is not limited to the configuration described in the first embodiment, and may be a different configuration.

<Second Variation>

In the first embodiment, the similarity is calculated by integrating the reference feature values 232, and then comparing the integrated reference feature value 232 with the recognition feature value. However, the similarity to the recognition feature value may be calculated for each of the reference feature values 232 and then the similarities of the reference feature values 232 may be integrated.

Referring to FIG. 10, the similarity calculation process (step S22 of FIG. 6) in this case will be described.

The processes from step S61 to step S66 are performed by treating each of the classifications as a target classification.

The processes from step S61 to step S62 are the same as the processes from step S31 to step S32 of FIG. 7. In step S63, the similarity calculation unit 213 calculates a dissimilarity between each reference feature value 232 acquired in step S61 and the recognition feature value acquired in step S62.

In step S64, the similarity calculation unit 213 advances the process to step S65 if more than one reference feature value 232 has been retrieved in step S61, and advances the process to step S66 if one reference feature value 232 has been retrieved in step S61. In step S65, the similarity calculation unit 213 treats the average of the dissimilarities to the reference feature values 232 calculated in step S63 as the dissimilarity with regard to the target classification. Note that the similarity calculation unit 213 may determine one dissimilarity for the target classification by any method, which is not limited to averaging.

The processes from step S66 to step S67 are the same as the processes from step S36 to step S37 of FIG. 7.

<Third Variation>

In the first embodiment, the functional components are realized by software. However, as a third variation, the functional components may be realized by hardware. With regard to the third variation, differences from the first embodiment will be described.

Configurations of the machine learning device 10 and the feature identification device 20 according to the third variation will be described.

When the functional components are realized by hardware, the machine learning device 10 includes an electronic circuit in place of the processor 11, the memory 12, and the auxiliary storage device 13. The electronic circuit is a dedicated circuit that realizes the functions of the functional components, the memory 12, and the auxiliary storage device 13. Similarly, when the functional components are realized by hardware, the feature identification device 20 includes an electronic circuit in place of the processor 21, the memory 22, and the auxiliary storage device 23. The electronic circuit is a dedicated circuit that realizes the functions of the functional components, the memory 22, and the auxiliary storage device 23.

The electronic circuit is assumed to be a single circuit, a composite circuit, a programmed processor, a parallel-programmed processor, a logic IC, a gate array (GA), an application specific integrated circuit (ASIC), or a field-programmable gate array (FPGA).

The functional components may be realized by one electronic circuit, or the functional components may be distributed among and realized by a plurality of electronic circuits.

<Fourth Variation>

As a fourth variation, some of the functional components may be realized by hardware, and the rest of the functional components may be realized by software.

Each of the processors 11, 21, the memories 12, 22, the auxiliary storage devices 13, 23, and the electronic circuit is referred to as processing circuitry. That is, the functions of the functional components are realized by the processing circuitry.

REFERENCE SIGNS LIST

10: machine learning device, 11: processor, 12: memory, 13: auxiliary storage device, 14: communication interface, 111: sampling unit, 112: binary image conversion unit, 113: image generation unit, 114: feature value extraction unit, 115: image reconstruction unit, 116: parameter updating unit, 131: learning image data, 132: first parameter, 133: second parameter, 20: feature identification device, 21: processor, 22: memory, 23: auxiliary storage device, 24: communication interface, 211: feature extraction unit, 212: feature changing unit, 213: similarity calculation unit, 214: influence calculation unit, 215: feature identification unit, 231: registered image data, 232: reference feature value, 233: recognition target data, 30: communication channel, 100: feature identification system.

The invention claimed is:

1. A feature identification device comprising:
processing circuitry to:
treat each of a plurality of classifications as a target classification, and calculate a similarity between a reference feature value and a recognition feature value, the reference feature value being a feature value extracted from image data of the target classification, the recognition feature value being a feature value extracted from recognition target data, which is image data to be recognized;

calculate an influence on the similarity with regard to each partial image of the recognition target data by taking as input the similarity calculated with regard to each of the plurality of classifications and the recognition feature value; and change the recognition feature value in accordance with the calculated influence.

2. The feature identification device according to claim 1, wherein the processing circuitry calculates the similarity by calculating a distance between the reference feature value and the recognition feature value.

3. The feature identification device according to claim 1, wherein with regard to each of the plurality of classifications, the processing circuitry calculates, as the influence, a magnitude of impact on the similarity when each partial image of the recognition target data is changed.

4. The feature identification device according to claim 1, wherein the processing circuitry changes the recognition feature value by using the influence as a weight and weighting the recognition feature value.

5. The feature identification device according to claim 1, wherein the reference feature value and the recognition feature value are extracted by a feature extraction model that does not have information on the plurality of classifications.

6. The feature identification device according to claim 5, wherein the feature extraction model is a first neural network generated by a machine learning device that updates parameters of the first neural network and a second neural network, based on a difference between converted binary data and learning binary data, the converted binary data being binary image data converted from learning data, which is image data to be learned, the learning binary data being binary image data resulting from converting the learning data by the second neural network based on a learning feature value, which is a feature value of the learning data extracted by the first neural network.

7. A feature identification method comprising:

treating each of a plurality of classifications as a target classification, and calculating a similarity between a reference feature value and a recognition feature value, the reference feature value being a feature value extracted from image data of the target classification, the recognition feature value being a feature value extracted from recognition target data, which is image data to be recognized;

calculating an influence on the similarity with regard to each partial image of the recognition target data by taking as input the similarity with regard to each of the plurality of classifications and the recognition feature value; and changing the recognition feature value in accordance with the influence.

8. A non-transitory computer readable medium storing a feature identification program that causes a computer to function as a feature identification device to execute:

a similarity calculation process of treating each of a plurality of classifications as a target classification, and calculating a similarity between a reference feature value and a recognition feature value, the reference feature value being a feature value extracted from image data of the target classification, the recognition feature value being a feature value extracted from recognition target data, which is image data to be recognized;

an influence calculation process of calculating an influence on the similarity with regard to each partial image of the recognition target data by taking as input the similarity with regard to each of the plurality of classifications calculated by the similarity calculation process and the recognition feature value; and a feature identification process of changing the recognition feature value in accordance with the influence calculated by the influence calculation process.

* * * * *